United States Patent [19]
Rodrigues

[11] 3,900,009
[45] Aug. 19, 1975

[54] RESTRAINING DEVICE

[76] Inventor: Antonio A. Rodrigues, 8302 18th Ave., Lemoore, Calif. 93245

[22] Filed: May 23, 1974

[21] Appl. No.: 472,845

[52] U.S. Cl. .................................................. 119/96
[51] Int. Cl.² ............................................ A01K 3/00
[58] Field of Search ....... 119/96, 27, 149, 11, 14.03

[56] References Cited
UNITED STATES PATENTS
3,734,059    5/1973    Rodrigues............................ 119/27

Primary Examiner—Louis G. Mancene
Assistant Examiner—Peter K. Skiff
Attorney, Agent, or Firm—Huebner & Worrel

[57] ABSTRACT

A restraining device for confining a plurality of milch cows during milking operations. The invention is characterized by at least one cantilevered restraining rail supported for oscillation in orthogonally related planes and provided with a base end portion and a distal end portion pivotally connected with the base end portion and supported thereby for oscillatory motion about a vertically oriented axis, and manually operable locking means for releasibly securing the distal end portion against oscillatory motion about said substantially vertically oriented axis.

9 Claims, 6 Drawing Figures

PATENTED AUG 19 1975 3,900,009
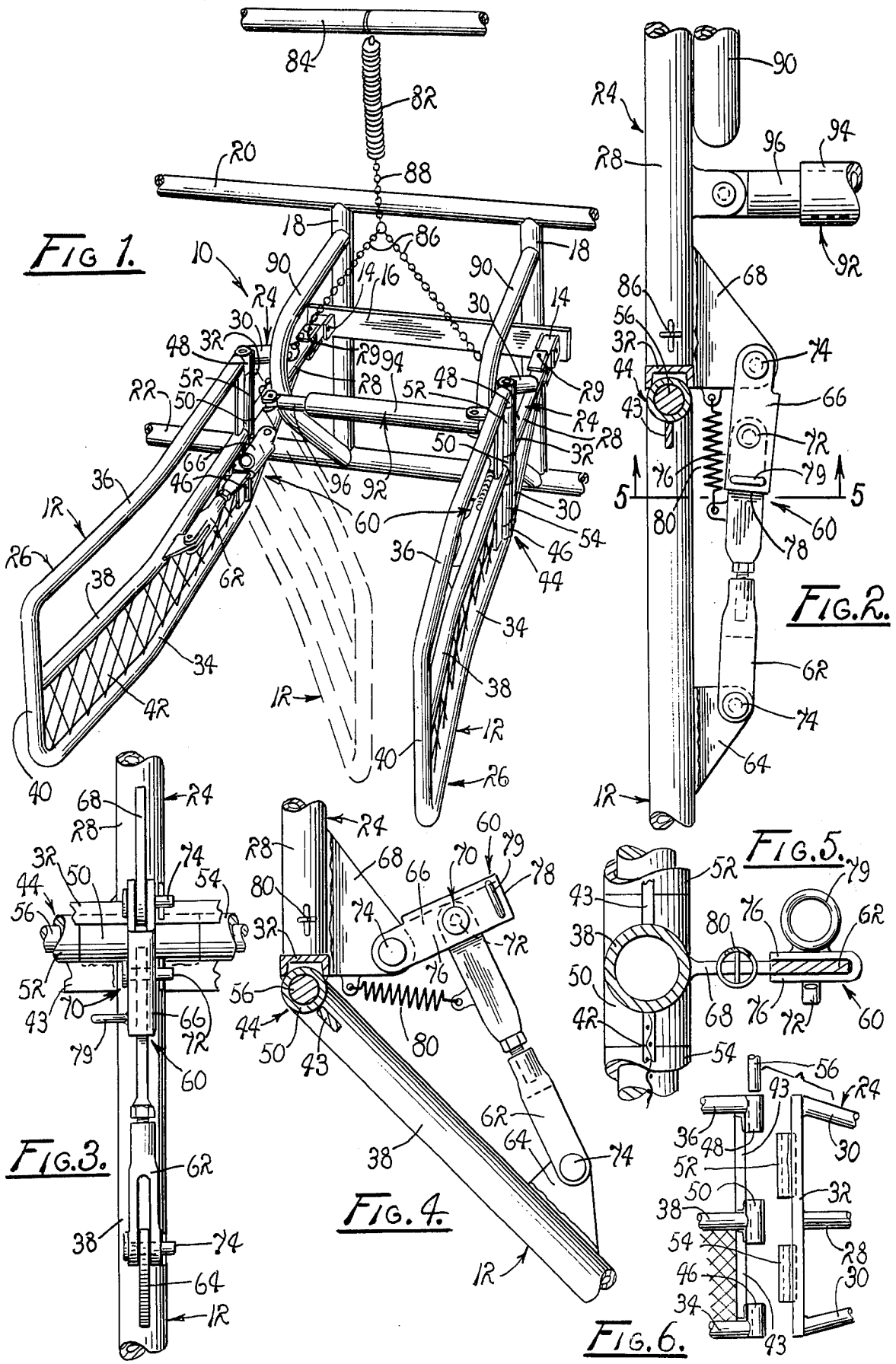

RESTRAINING DEVICE

BACKGROUND OF THE INVENTION

The invention generally relates to restraining devices for milch cows and more particularly to an improved, economic restraining device for use in protecting workmen during milking operations.

The prior art is replete with restraining devices employed in restraining animals for various purposes. Among such devices are restraining devices having particular utility in restraining milch cows during milking operations. One such device is disclosed and claimed in United States Letters Patent No. 3,734,059 granted to Antonio A. Rodrigues, May 22, 1973, which is incorporated herein by reference thereto.

The general purpose of restraining devices of the type disclosed and claimed in the aforementioned patent is to protect workmen from injury resulting from kicking, squeezing and similar hazardous activities of cows confined in milking stanchions and the like. These hazards are increased during the course of the training of unbroken milch cows.

It has been found that through the use of the restraining rails disclosed in the aforementioned patent, many of the disadvantages and difficulties prevailing in the dairy industry are overcome, due to the fact that horizontal and vertical oscillatory motion is afforded the restraining rails. Hence, the device disclosed and claimed in the aforementioned patent serves quite satisfactorily for its intended purpose.

However, in practice, it often is desirable to accommodate an introduction and/or removal of only one cow at a time from milking stanchions. Since the restraining rails disclosed in the aforementioned patent are shaped to an approximate configuration of a lateral surface of a cow, it is quite difficult to introduce and/or remove one cow at a time without pivotally elevating a pair of the rails.

Moreover, under certain circumstances a use of a mechanism for pivotally elevating the rails may be deemed to be impractical or otherwise undesirable.

It is therefore the general purpose of the instant invention to provide an improved restraining device including resiliently supported restraining rails for confining a plurality of milch cows during milking operations, which device is economic to construct, can readily be included in existing dairy barns and accommodates the handling of only one cow at a time.

OBJECTS AND SUMMARY OF THE INVENTION

It is therefore an object of the instant invention to provide an improved restraining device which overcomes the aforementioned difficulties and disadvantages.

It is another object to provide an improved restraining device for substantially confining a milch cow during milking operations.

It is another object to provide in a restraining device for confining a pair of milch cows during milking operations, at least one pair of restraining rails, each of which includes a base end portion and a distal end portion pivotally coupled to the base end portion for rotation about a substantially vertical axis.

It is another object to provide an improved, economic restraining device including a plurality of restraining rails which readily can be incorporated within existing barns and employed for handling one cow at a time.

These and other objects and advantages are achieved through the provision of a restraining device which includes at least one pair of resiliently supported, cantilevered restraining rails, each of the rails being characterized by a base end portion and a distal end portion, the distal end portion of each rail being pivotally connected with the base end portion thereof and supported thereby for oscillatory motion about a substantially vertically oriented axis of oscillation, manually operable locking means for releasibly securing the distal end portion against oscillatory motion about the vertically oriented axis, at least one resilient suspension member connected with the pair of restraining rails for supporting the rails for simultaneous oscillation about a second and a third axis of oscillation, said second axis of oscillation being extended in a substantially vertically oriented plane while said third axis of oscillation is extended in a substantially horizontally oriented plane, and a stop for rigidly restraining each rail of said pair against oscillatory motion about said second axis of oscillation, as will hereinafter become more readily apparent by reference to the following description and claims in light of the accompanying drawings.

BRIEF DESCRIPTION OF THE DRAWINGS

FIG. 1 is a fragmented perspective view of an improved restraining device which embodies the principles of the instant invention.

FIG. 2 is a fragmented top plan view of a restraining rail included within the device shown in FIG. 1.

FIG. 3 is a fragmented view, similar to FIG. 2, but rotated through 90° with respect to the plane of the drawings.

FIG. 4 is a fragmented top plan view of one of the rails shown in FIG. 1 with portions thereof being angularly displaced about a hinge, in the manner depicted by phantom lines in FIG. 1.

FIG. 5 is a cross-sectional view taken generally along line 5—5 of FIG. 2.

FIG. 6 is a fragmented, exploded view illustrating the hinge.

DESCRIPTION OF THE PREFERRED EMBODIMENT

Referring now to the drawings wherein like reference characters designate like or corresponding parts throughout the several views there is shown in FIG. 1 an improved restraining device, generally designated 10, which embodies the principles of the instant invention.

The restraining device 10 includes a pair of cantilevered rails 12 disposed in substantial parallelism. Since the rails 12 are of a common design and function in a similar manner, a detailed description of a single one of the rails 12 is deemed adequate to provide a complete understanding of the instant invention.

As shown in the drawing, each of the rails 12 is supported by a clevis coupling 14 including a horizontally oriented pivot pin, not designated, affixed to a supporting beam 16. This beam is extended between a pair of vertical bars 18 and is rigidly affixed thereto. The bars 18 are, in turn, extended between a head rail 20 and a base rail 22 of a milking stanchion, not designated. Since milking stanchions are well known, and the stanchion herein referred to forms no specific part of the instant invention, a detailed description of the stanchions is omitted in the interest of brevity.

As shown, the rail 12 is of an elongated configuration and includes a base end portion 24 and a distal end portion 26. The base end portion 24 is of an all-welded configuration and serves to pivotally support the distal end portion 26 in a cantilevered fashion. The base end portion 24 includes a center beam 28 pinned to the clevis coupling 14 by a suitable pivot pin 29 extended in a substantially vertical plane. It is to be understood that through the coupling 14, and the pin 29, the rail 12 is afforded oscillatory motion in both vertical and horizontal planes in a manner similar to that disclosed in the aforementioned patent to Antonio A. Rodrigues.

Extended diagonally from the center beam 28, toward the distal end portion 26, there is a pair of uniformly diverging beams 30 which terminate in a common vertical plane. As a practical matter, the center beam 28 also terminates in this plane. In order to interconnect the coplanar ends of the beams 28 and 30 a channnular extrusion member 32 is extended between the ends of the beams 30 and rigidly affixed to the adjacent ends thereof, as well as to the center beam 28, by welding or other suitable means.

The distal end portion 26 of the rail 12 includes a bottom beam 34, a top beam 36 and an intermediate beam 38 interposed midway between the top and bottom beams. The beams 34, 36, and 38 are disposed in substantial parallelism in a common, substantially vertical plane. However, it is to be noted that these beams are similarly deflected from the plane, near the mid-portions thereof, so as to be shaped to substantially conform to a slightly arcuate configuration whereby the rail 12 is caused to assume a configuration conforming to the lateral surface of a cow or similar animal. It is to be understood that the beams 34, 36, and 38 are interconnected at one end thereof through an end or connecting segment 40. As a practical matter, where so desired, the bottom beam 34, the top beam 36, and the connecting segment 40 may be formed from a singular length of tubing, through well known bending techniques, with the intermediate beam being formed of a length of tubing which is welded to the segment 40. Moreover, and as a practical matter, between the bottom beam 34 and the intermediate beam 38 there is provided a protective screen 42 formed from expanded mesh, welded or similarly affixed to the beams 34 and 38. This screen serves to prevent cows from inserting a leg between the beams.

The ends of the beams 34, 36 and 38 terminate in a substantially common plane, disposed in juxtaposition with the channnular extrusion 32, and are interconnected through a suitable strap 43. The base end portion 24 and the distal end portion 26 of the rail 12 are interconnected through a hinge 44. The hinge 44 includes a first sleeve 46 welded to the end of the bottom beam 34, a second sleeve 48 welded to the end of the top beam 36 and a third sleeve 50 welded to the end of the intermediate beam 38. It is important to note that the first, second and third sleeves, designated 46, 48 and 50, are coaxially aligned and are arranged in orthogonal relation with the longitudinal axis of the rail 12. Moreover, these sleeves are disposed in a mutually spaced relationship.

Welded to the channnular extrusion 32, in coaxial alignment, there is a fourth sleeve 52 and a fifth sleeve 54. The sleeves 52 and 54 are suitably dimensioned and spaced apart a suitable distance for receiving therebetween the third sleeve 50 while being received in coaxial alignment between the mutually spaced sleeves 46, 48 and 50. A hinge pin 56 is extended through the coaxially aligned sleeves 46 through 54 in a manner well understood by those familiar with the fabrication of hinges. If desired, the hinge pin 56 is welded or similarly secured in place. Thus, it is to be understood that the distal end portion 26 is pivotally connected with the base end portion 24 and supported thereby for pivotal motion about a vertically oriented axis passing through the hinge 44.

In order to obviate pivotal displacement of the distal end portion 26 relative to the base end portion 24, in a direction away from a cow restrained thereby, there is provided a spring-loaded, over-center locking linkage 60. The locking linkage 60 includes a first link 62 pivotally supported by a mounting bracket 64 welded to the intermediate beam 38, and a second link 66 pivotally connected with a bracket 68 welded to the center beam 28. The links 62 and 66 are connected at a knee joint 70. As a practical matter, the knee joint 70 includes a pivot pin 72 while the links 62 and 66 are connected with the brackets 64 and 68, respectively, by suitable pivot pins 74. Moreover, the link 66 preferably includes a pair of plates 76 disposed in spaced parallel planes for receiving therebetween the adjacent end of the link 62 in a manner and for a purpose well understood by those familiar with over-center locking linkages. As a practical matter the link 66 includes a segment 78 projected from the pin 72 which engages the lateral surface of the link 62 and functions as a stop for the knee joint. A grasping ring 79 is affixed to the uppermost plate 76 for facilitating a releasing of the knee joint 70. A tension spring 80 is included for biasing the knee joint into a locked configuration, as illustrated in FIG. 2.

The rails 12 are suspended by a tension linkage including a tension spring 82 suspended from a cross beam 84 and a pair of suspension chains 86. These chains are connected at one end with the center beam 28 and at the other with the spring 82 through a common connecting length of chain 88. It will therefore be appreciated that the spring 82 serves to resiliently support the rails 12 for oscillation about both a horizontal axis, passing through the coupling 14, and a vertical axis coincident with the longitudinal axis of the pin 29, while the base end portion 24 supports the distal end portion 26 in a cantilevered fashion for pivotal oscillation about an axis extended vertically through the hinge 44.

In order to limit pivotal displacement of each of the rails 12, there is provided a rigid stop 90 horizontally projected from one of the upright bars 18 in parallelism with the base end portion 26 of the rail. The stop 90 is formed of tubing and is of an arcuate configuration and so positioned as to oppose pivotal motion imparted to the rail 12 in a selected horizontal direction. Thus, the rails 12 may be moved with a pivotal motion toward a cow and against the applied forces of the spring 82 but restrained against predetermined pivotal motion urged by the spring 82, or a cow confined by the rail, also in a manner similar to that described in the aforementioned patent to Antonio A. Rodrigues.

A telescopic linkage 92 is extended between the rails 12 of each pair of adjacent rails and pinned to the center beams 28 thereof. The telescopic linkage 92 serves to couple the rails together for assuring that vertical motion in common directions is imposed on the rails of the pair while mutually opposed horizontal motion is accommodated. To achieve this, the telescopic linkage 92 includes a first barrel 94 pinned to the center beam 28 of the base end portion 24 of one of the rails 12 while a second barrel 96 is telescopically received within the barrel 94 and is pivotally pinned to the center beam 28 of the adjacent rail 12.

Of course, while it is highly desirable to employ the rails 12 disposed in pairs, it should readily be apparent that the rails 12 can each be separately supported by a resilient suspension system independently of any other rail and the telescopic linkage deleted for thus permitting each of the rails 12 to be utilized independently of each other.

OPERATION

It is believed that in view of the foregoing description, the operation of the device will readily be understood and it will be briefly reviewed at this point.

With the restraining device 10 assembled in the manner hereinbefore described, it is to be understood that by applying horizontally directed pressure to the grasping ring 79, the locking link 60 is released at the knee joint 70, for motion in a direction opposite to that in which the forces of the spring 82 are applied for thus permitting the distal end portion 26 of the rail to pivot about the hinge pin 56, whereupon a single cow can be admitted to the milking stanchion without elevating the rail. Once a cow is in place, the distal end portion 26 is again pivoted about the hinge pin 56 causing the distal end portion 26 to be disposed in substantially coplanar relation with the base end portion 24. The locking linkage 60 is again rendered effective by applying appropriately directed pressure to the knee joint 70 causing the segment 78 of the link 66 to seat against the lateral surface of the link 62. The rail 12 may now be moved vertically and horizontally for accommodating the application of a milking machine or similar operations.

Once the milking operation has been completed, each of the rails, at an appropriate instant, is again released by applying lateral pressure to the grasping ring 79 of the locking linkage 60 for thus causing the distal end portion of the rail to pivot relative to the base end portion for thereby releasing the restrained cow. Of course, the spring 82 continuously urges each of the rails 12 into an abutted relationship with the stop 90, however, the rails can be moved in either a vertical or a horizontal plane against the applied pressure of the spring 82.

In view of the foregoing, it should readily be apparent that the rail of the instant invention provides a practical solution to the problem of accommodating the handling of a single cow when employing restraining rails of the type discloseed in the aforementioned patent to Antonio A. Rodrigues.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a restraining device for substantially confining a milch cow during milking operations, the improvement comprising:
at least one elongated restraining rail for imparting lateral support for a milch cow, including a base end portion and a distal end portion, said distal end portion being pivotally supported by said base end portion for oscillatory motion about a pivotal axis interposed between the opposite ends of the rail and orthogonally related to the longitudinal axis thereof; and
manually operable locking means for releasably securing the distal end portion of said rail against oscillatory motion about said pivotal axis.

2. The improvement of claim 1 further comprising means for supporting said rail for simultaneous oscillatory motion in a pair of orthogonally related planes.

3. The improvement of claim 1 wherein said locking means includes a spring-loaded, over-center locking link having one end pivotally connected with said base end portion and the opposite end thereof pivotally connected to said distal end portion.

4. The improvement of claim 3 further comprising means for supporting said base end portion for oscillatory motion about a pivotal axis extended in a vertical plane.

5. The improvement of claim 3 further comprising means for supporting said base end portion for oscillatory motion about a pivotal axis extended in a substantially horizontal plane.

6. The improvement of claim 3 further comprising means for supporting said base end portion for simultaneous oscillatory motion about a pair of orthogonally related axes.

7. A restraining device for confining a plurality of milch cows during milking operations comprising:
A. at least one pair of horizontally extended, cantilevered restraining rails, each of said rails being characterized by a base end portion and a distal end portion, the distal end portion of each rail being pivotally connected with said base end portion and supported thereby for oscillatory motion about a vertically oriented first axis of oscillation, and manually operable locking means for releasibly securing said distal end portion against oscillatory motion about said vertically oriented axis; and
B. means including at least one resilient suspension member connected with said pair of restraining rails for supporting said rails for simultaneous oscillatory motion about a second and a third axis of oscillation, said second axis of oscillation being extended in a vertically oriented plane, and said third axis of oscillation being extended in a horizontally oriented plane, and a stop means for rigidly restraining each rail of said pair against oscillatory motion about said second axis of oscillation.

8. The device of claim 7 further comprising means for restraining each of said rails against vertical motion relative to the other rail of said pair and for accommodating relative horizontal motion therebetween including a horizontally extended telescopic linkage extended between said pair of rails for coupling one rail of said pair to the other rail thereof.

9. The device of claim 8 wherein each of said rails is shaped to an approximate configuration of a lateral surface of a milch cow and wherein said stop means includes a pair of laterally spaced rigid abutments projected in horizontal parallelism into engagement with the base end portions of said rails.

* * * * *